United States Patent
Rotem et al.

(10) Patent No.: US 7,181,357 B1
(45) Date of Patent: Feb. 20, 2007

(54) METHOD AND APPARATUS TO CALIBRATE THERMOMETER

(75) Inventors: Efraim Rotem, Haifa (IL); Barnes Cooper, Tigard, OR (US); Ben Karr, Sunnyvale, CA (US); Ravi Rangarajan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/220,913

(22) Filed: Sep. 8, 2005

(51) Int. Cl.
*G01K 15/00* (2006.01)
*G01K 1/00* (2006.01)
*G01K 3/00* (2006.01)

(52) U.S. Cl. .................. 702/99; 702/130; 702/132; 374/110; 374/166

(58) Field of Classification Search .............. 702/99, 702/130, 132, 136, 57, 58; 374/1, 101, 110, 374/163, 166
See application file for complete search history.

(56) References Cited

U.S. PATENT DOCUMENTS

| | | | |
|---|---|---|---|
| 6,996,491 B2* | 2/2006 | Gold et al. | 702/132 |
| 7,031,865 B2* | 4/2006 | Bathurst et al. | 702/117 |
| 2005/0204825 A1* | 9/2005 | Kunerth et al. | 73/786 |

* cited by examiner

*Primary Examiner*—Michael Nghiem
*Assistant Examiner*—Meagan S. Walling
(74) *Attorney, Agent, or Firm*—Pearl Cohen Zedek Latzer, LLP

(57) ABSTRACT

Briefly, a processor and a method to calibrate a temperature reading of a digital thermometer. The calibration is done by using a first temperature value measured by an analog temperature sensor located at one point on the processor die and a second temperature value measured by a digital temperature sensor located at a second point of the processor die.

22 Claims, 4 Drawing Sheets

METHOD AND APPARATUS TO CALIBRATE THERMOMETER

BACKGROUND OF THE INVENTION

A central processing unit (CPU) performance may be thermally limited and may depend on both "external" cooling capabilities such as, for example, passive and active components (e.g. heat sink, fans, etc.) and "internal" power control mechanisms such as, for example, a software application. The power control mechanism may include a power detection mechanism and a power reduction mechanism. The power detection mechanism may detect high power conditions and may invoke the power reduction mechanism.

The power control mechanism may use power monitoring methods, which may be based on analog temperature measurements. The power monitoring methods may require the use of relatively large on-die components, such as, for example, a thermal diode which may be located at a limited number of predetermined "hot-spots", to report the power consumption of the CPU.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
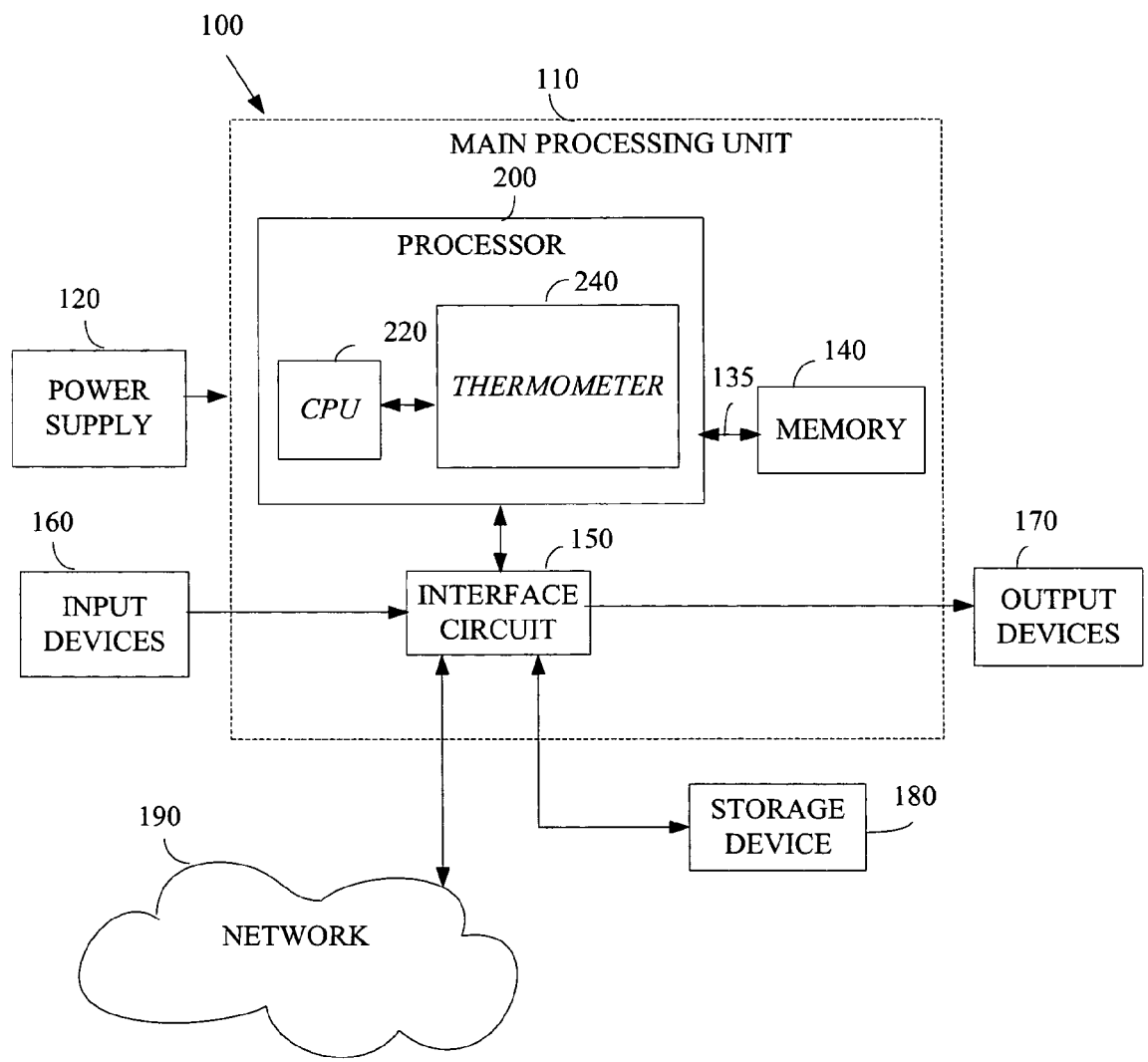
FIG. 1 is a schematic block diagram of a computer system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussion, it is appreciated that throughout the specification discussions utilizing terms such as "processing," "computing," "calculating," "determining," or the like, refer to the action and/or processes of a computer or computer system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, "plurality of instructions" describes two or more instructions.

It should be understood that the present invention may be used in a variety of applications. Although the present invention is not limited in this respect, the circuits and techniques disclosed herein may be used in many apparatuses such as computer systems, processors, CPU, memories, chipset graphics controllers or the like. Processors intended to be included within the scope of the present invention include, by way of example only, a reduced instruction set computer (RISC), a processor that have a pipeline, a complex instruction set computer (CISC) and the like.

Some embodiments of the invention may be implemented, for example, using a machine-readable medium or article which may store an instruction or a set of instructions that, if executed by a machine (for example, by a processor and/or by other suitable machines), cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Turning to FIG. 1, a block diagram of a computer system 100 according to an exemplary embodiment of the invention is shown. Although the scope of the present invention is not limited in this respect, computer system 100 may be a personal computer (PC), a personal digital assistant (PDA), an Internet appliance, a cellular telephone and/or any other computing device. In one example, computer system 100 may include a main processing unit 110 powered by a power supply 120. In embodiments of the invention, main processing unit 110 may include a processor 200 electrically coupled by a system interconnect 135 to a memory device 140 and one or more interface circuits 150. For example, the system interconnect 135 may be an address/data bus, if desired. It should be understood that interconnects other than buses may be used to connect processor 200 to memory device 140. For example, one or more dedicated lines and/or a crossbar may be used to connect processor 200 to memory device 140.

According to some embodiments of the invention, processor 200 may include one or more CPU's 220 and a thermometer 240. In addition, processor 200 may include a cache memory (not shown), such as, for example, static random access memory (SRAM) and the like, or any other type of internal integrated memory. Memory device 140 may include a dynamic random access memory (DRAM), a non-volatile memory, or the like. In one example, memory device 140 may store a software program which may be executed by processor 200, if desired.

Although the scope of the present invention is not limited in this respect, interface circuit(s) 150 may include an Ethernet interface and/or a Universal Serial Bus (USB) interface, and/or the like. In some exemplary embodiments of the invention, one or more input devices 160 may be connected to interface circuits 150 for entering data and commands into the main processing unit 110. For example, input devices 160 may include a keyboard, mouse, touch screen, track pad, track ball, isopoint, a voice recognition system, and/or the like.

Although the scope of the present invention is not limited in this respect, the output devices 170 may be operably coupled to main processing unit 110 via one or more of the interface circuits 150 and may include one or more displays, printers, speakers, and/or other output devices, if desired. For example, one of the output devices may be a display. The display may be a cathode ray tube (CRT), a liquid crystal display (LCD), a plasma display or any other type of graphic display.

Although the scope of the present invention is not limited in this respect, computer system 100 may include one or more storage devices 180. For example, computer system 100 may include one or more hard drives, one or more compact disk (CD) drives, one or more digital versatile disk drives (DVD), and/or other computer media input/output (I/O) devices, if desired.

Although the scope of the present invention is not limited in this respect, computer system 100 may exchange data with other devices via a connection to a network 190. The network connection may include any type of network connection, such as, for example, an Ethernet connection, a digital subscriber line (DSL), a telephone line, a coaxial cable, a wireless network interface card, etc. Network 190 may be any type of network, such as the Internet, a telephone network, a cable network, a wireless network such as, for example, a network complying IEEE standard 802.11 a/b/g, 1999, and/or the like. According to exemplary embodiment of the present invention the wireless network interface card may provide network connectivity to the computer system 100, if desired.

Although the scope of the present invention is not limited to this exemplary embodiment of the invention, thermometer 240 may measure temperature of "hot spots" of CPU 220 and may provide the temperature of CPU 220 to power control and/or temperature control mechanisms. The power control and/or temperature control mechanism may control the power consumption of processor 200, if desired. It should be understood that according to embodiments of the present invention thermometer 240 may be implemented by hardware, or by software, or by any combination of hardware and/or software.

Figure 2:
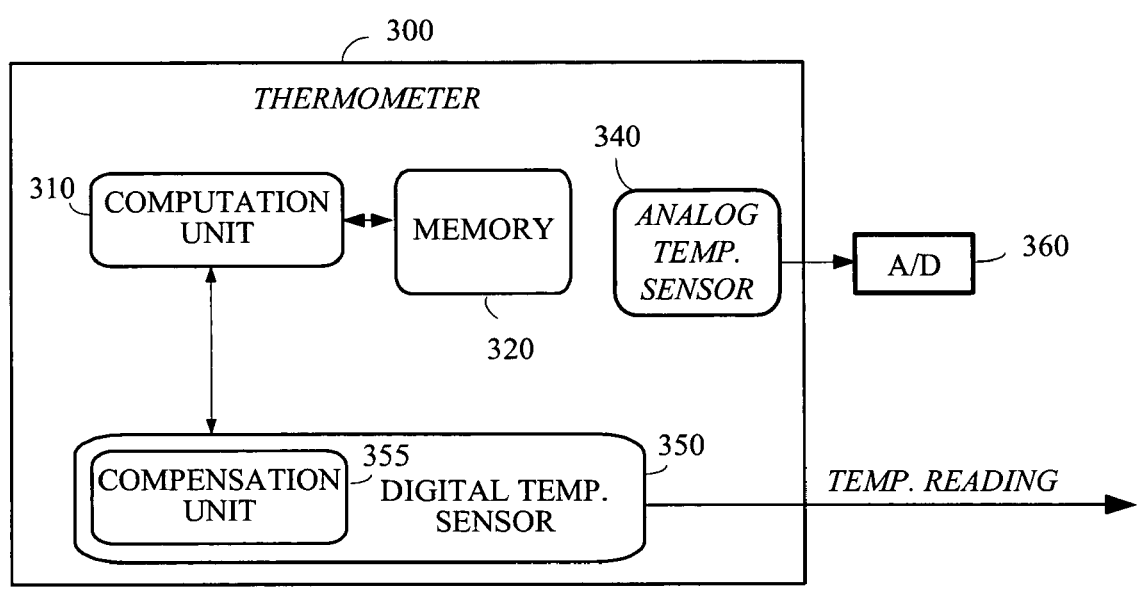
FIG. 2 is a schematic block diagram of a thermometer according to an exemplary embodiment of the present invention.

Turning to FIG. 2, a block diagram of a thermometer 300 according to an exemplary embodiment of the present invention is shown. Although the scope of the present invention is not limited in this respect, thermometer 300 may include a computation unit 310, a memory 320 an analog temperature sensor 340 and a digital temperature sensor.

Although the scope of the present invention is not limited in this respect, an analog to digital converter (A/D) 360 may be externally coupled to thermometer 300. According to some embodiments of the invention A/D 360 may convert an analog signal related to a temperature measured by analog temperature sensor 340 into a digital signal related to the measured temperature.

According to exemplary embodiments of the invention, memory 320 may include for example, a volatile memory, a non-volatile memory or the like. Analog temperature sensor 340 may include a thermal diode and digital temperature sensor 350 may include a compensation unit 355, although it should be understood that the scope of the present invention is in no way limited in this respect.

Although the scope of the present invention is not limited in this respect, in order to provide an accurate temperature reading a calibration procedure of thermometer 300 may be performed. For example, the behavior of thermometer 300 may be described in the form of a linear equation, e.g., T=KX+B where:

T may be a value of a real temperature;
X may be a reported temperature measurement value;
K may be a constant value of a slope of the linear equation; and
B may be a constant value of an offset of the linear equation.

Solving the linear equation to determine the K and B values may require solving the following two equations:

$$T1 = KX1 + B \tag{1}$$

$$T2 = KX2 + B \tag{2}$$

According to one embodiment of the present invention, computation device 310 may solve the above two equations 1 and 2, or similar equations, and may store the K and B values in memory 320. Accurately solving equations 1 and 2 may require measuring, substantially simultaneously, temperatures T1 and T2 by analog temperature sensor 340 and temperature values X1 and X2, by digital temperature sensor 350.

According to another exemplary embodiment of the invention, memory 320 may store X1 and T1 temperature values. Thus, only one measurement of X2 and T2 may be needed for calculating the equation constants K and B. Yet, according to another embodiment, a known reference point, for example, where T1=X1 and B=0, may be used. Thus, only one measurement of T may be needed to calculate K. According to this exemplary embodiment of the invention, a temperature of 100° C. may be used as a first reference temperature and the temperature may be calculated according to T=100° C.-K*X, if desired.

Although the scope of the present invention is not limited to this respect, it should be understood that thermometer 300 may be implemented by hardware, by software or by any combination of hardware and software. For example, some components may be implemented by hardware while other components may be implemented by software. According to this exemplary embodiment memory 320, e.g., a non volatile memory, may store the first test temperature information (e.g., X1) and the computation results (e.g., T1). Computation unit 310 may perform the calculation of the constants K and B by hardware or by using a Binary Operating System (BIOS) procedure, if desired. The results of the computation may be stored in memory 320 and may be used for temperature curve fitting, if desired.

Alternatively or additionally, the temperature curve fitting may be done by compensation unit 355. According to various embodiments of the invention, compensation unit 355 may include for example, an analog compensation circuit, a digital calculation logic, microcode routine, embedded controller and/or software procedure such as, for example a BIOS and/or device driver to calculates the temperature, if desired.

Figure 3:
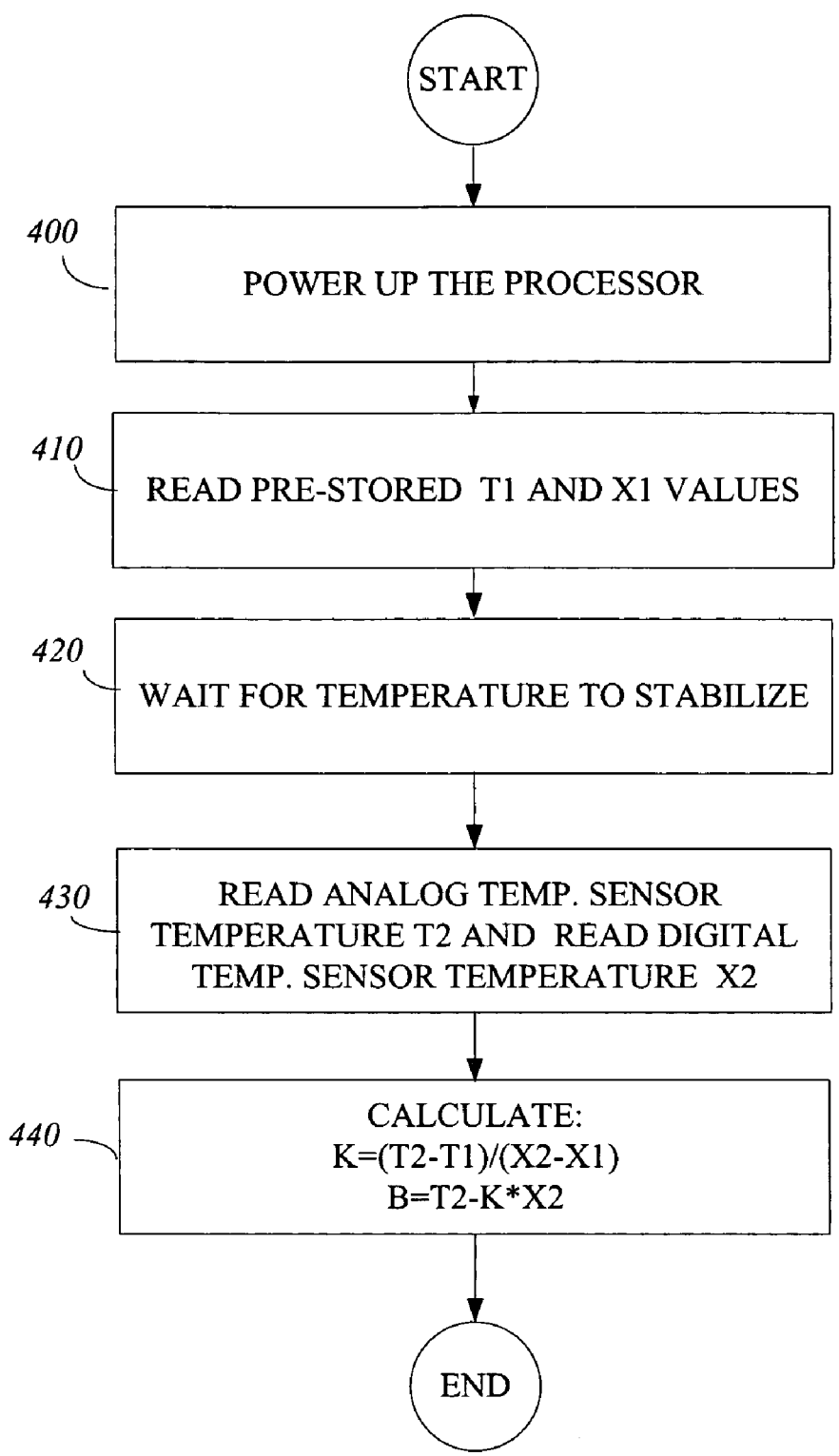
FIG. 3 is a schematic flowchart of a method to calibrate a temperature reading of a thermometer according to exemplary embodiments of the invention.

Turning to FIG. 3, a flowchart of a method to calibrate a temperature reading of a thermometer according to exemplary embodiments of the invention is shown. The method may start with a processor (e.g. processor 200) power up (text block 400) procedure. For example, the power up procedure may include booting the processor and performing BIOS execution. After power up, the process may run at a low activity workload; therefore, the temperature distribution on the processor die may be close to a uniform temperature and the measurement of T1 and X1 may be done and stored in a non volatile memory (e.g., memory 140).

According to some embodiments of the invention, a first set point of the temperature equation (e.g., T=KX+B) may be provided by a reading of pre-stored T1 and X1 values (text block 410). The second set point (e.g., X1, T1) may be provided after waiting for the processor temperature to stabilize (text box 420). The waiting period may be determined, for example, according to statistical data of temperature stabilization time of the processor. For example, the stabilization time may be determined from a stabilization point of the processor temperature.

According to one exemplary embodiment of the invention, the stabilization point of the processor temperature may be determined by comparing an average of temperature points to a standard deviation of the processor temperature. A stabilization point of the processor temperature may be achieved if the average temperature points are within the standard deviation, although the scope of this exemplary embodiment is not limited in this respect.

After the temperature of the processor has been stabilized, a measurement of T2 may be performed by reading the temperature from an analog temperature sensor (e.g., analog temperature sensor 340) and a measurement of X2 may be performed by reading the temperature from a digital temperature sensor (e.g., digital temperature sensor 350) as is shown by text block 430. After achieving the first and second set points calculations of the constant K and B may be done by solving the following equations (text box 440):

$K=(T2-T1)/(X2-X1)$; and $B=T2-KX2$.

According to some embodiments of the invention the constants K, B may be stored in a volatile memory (e.g., memory 320) and may be used to provide a compensation to the temperature measurement of the thermometer.

Although it should be understood that the above temperature equation may be used to fit a linear curve, other forms of curve fitting may be performed. For example, a non linear fitting to compensate for non linear behavior of the analog temperature sensor, a combination of analog sensor and digital sensor temperature reading, compensation for B by applying a fixed offset in hardware and calculating the sloop K and the like.

Figure 4:
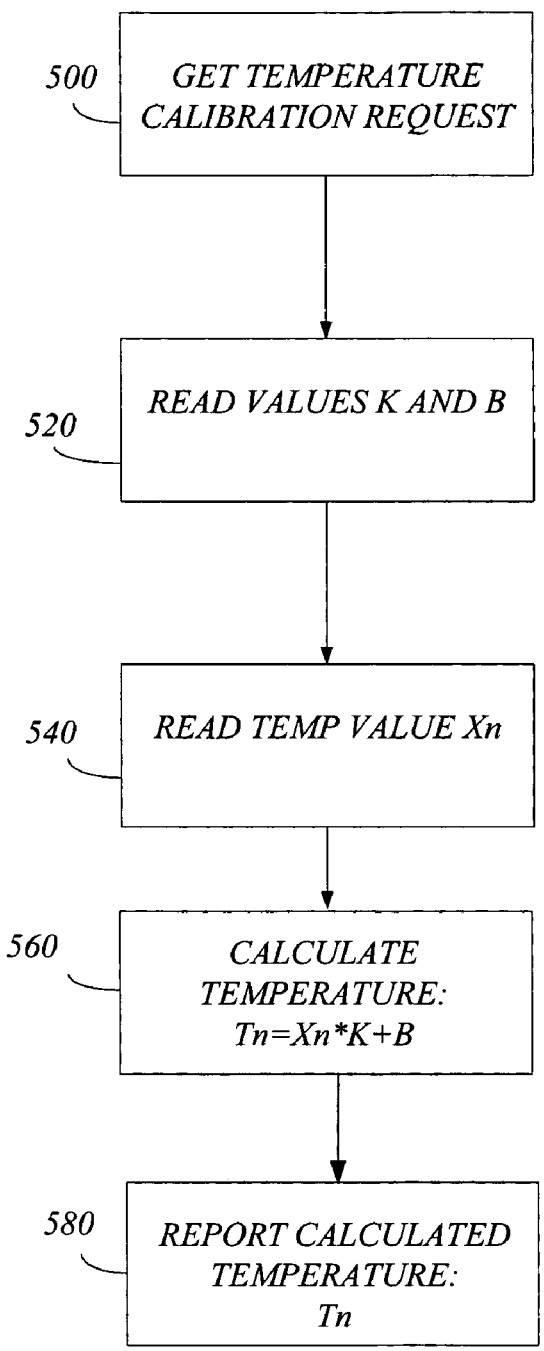
FIG. 4 is a schematic flowchart of a method to provide a calibrated temperature read value according to exemplary embodiment of the invention.

Turning to FIG. 4, an illustration of a flowchart of a method to provide a calibrated temperature read value according to exemplary embodiments of the invention is shown. The method may start by receiving a calibration request to a temperature read value (text block 500). For example, a read temperature value request may be generated by the BIOS, if desired. According to some exemplary embodiments of the invention, computation device 355 may read the linear temperature calibration function values B and K (text block 520). For example, computation device 355 and/or any other analog or digital fixed function unit, which may be capable of performing a linear and/or non-linear temperature calibration function, may calibrate a temperature read value of thermometer 300.

According to one exemplary embodiment of the invention, digital thermometer sensor 350 may read temperature value Xn (text block 540). Computation device 355 may calculate the calibrated temperature read value $T_n$ according to the linear temperature calibration function $Tn=K*Xn+B$, if desired (text block 360). The calibrated temperature value Tn may be reported to the computer BIOS, if desired (text block 580).

While certain features of the invention have been illustrated and described herein, many modifications, substitutions, changes, and equivalents will now occur to those skilled in the art. It is, therefore, to be understood that the appended claims are intended to cover all such modifications and changes as falls within the true spirit of the invention.

What is claimed is:

1. A computer system comprising:
   a thermometer having a computation unit capable of calculating a constant value of a slope of a linear temperature equation from temperatures values of first and second set points and capable of calculating a constant value of an offset of a temperature linear equation from temperatures values of the first and second set points operably coupled to a first temperature sensor to measure at a predetermined processor power state a first temperature read value to be used as a first set point in a temperature calibration process and to a second temperature sensor to measure a second temperature read value at a stabilized temperature state of the processor, to be used as a second set point in a temperature calibration process; and
   a processor capable of operating a Binary Operating System (BIOS) procedure to calculate a calibrated temperature read value according to first and second temperature read values of the first and second temperature sensors.

2. The computer system of claim 1, wherein the first temperature sensor comprises an analog temperature sensor and wherein the second temperature sensor comprises a digital temperature sensor.

3. The computer system of claim 2, wherein the digital temperature sensor comprises:
   a compensation unit to compensate temperature reading of the digital thermometer using stored constant values of the slope and the offset.

4. The computer system of claim 1, comprising a computer platform that includes the processor, wherein at least one of the first and second sensors are located on the computer platform.

5. The computer system of claim 1, wherein the processor comprises a processor die and wherein the first and second temperature sensors are located at different points on the processor die.

6. The computer system of claim 1, comprising:
a memory to store first and second temperature values measured at the first and second set points.

7. The computer system of claim 1, wherein the thermometer comprises:
a computation unit capable of calculating a non-linear temperature calibration function to provide a calibrated temperature read.

8. The computer system of claim 1, wherein the thermometer comprises:
a memory for storing the constant values of the slope and the offset.

9. A method comprising:
measuring a first temperature value of a processor at a first point on a processor at a predetermined power state of the processor to provide a first set point;
measuring a second temperature value of the processor at a second point on the processor after processor power up when the temperature of the processor is stabilized to provide a second set point;
calculating a constant value of a slope of a linear temperature equation from temperature values of the first and second set points;
calculating a constant value of an offset of the linear temperature equation from temperature values of the first and second set points;
storing the constant values of the slope and the offset in a memory; and
calibrating a temperature read value based on the first and second temperature values.

10. The method of claim 9, wherein calibrating comprises:
calibrating the temperature read value of a digital thermometer using the first temperature value of a processor measured by a first temperature sensor located at the first point on the processor, and the second temperature value of the processor measured by a second temperature sensor located at the second point on the processor.

11. The method of claim 10, comprising:
locating at least one of the first and second sensors on a computer platform which includes the processor.

12. The method of claim 10, wherein calibrating comprises:
calibrating the temperature read value according to a liner temperature calibration function.

13. The method of claim 9, wherein calibrating comprises:
calibrating the temperature read value according to a non-linear temperature calibration function.

14. The method of claim 9, wherein measuring the temperature at a predetermined power state comprises:
measuring the temperature at at least one of manufacturing stages of the processor.

15. The method of claim 9, comprising:
compensating one or more temperature read values of the digital thermometer by using one or more stored constant values of the slope and the offset.

16. A computer platform comprising:
a processor; and
a thermometer having a computation unit capable of calculating a constant value of a slope of a temperature linear equation from temperatures values of the first and second set points and capable of calculating a constant value of an offset of the temperature linear equation from temperatures values of the first and second set points, operably coupled to a first temperature sensor to measure at a predetermined processor power state a first temperature read value to be used as a first set point in a temperature calibration process and to a second temperature sensor to measure at a stabilized temperature state of the processor a second temperature read value to be used as a second set point in a temperature calibration process, wherein the thermometer is capable of providing a calibrated temperature read value according to first and second temperature read values of the first and second temperature sensors.

17. The computer platform of claim 16, wherein the first temperature sensor comprises an analog temperature sensor and the second temperature sensor comprises a digital temperature sensor.

18. The computer platform of claim 16, wherein the processor comprises a processor die and the first and second temperature sensors are located at different points on the processor die.

19. The computer platform of claim 16, comprising:
a memory to store first and second temperature values measured at the first and second set points.

20. The computer platform of claim 16, wherein the thermometer comprises:
a computation unit capable of calculating a non-linear temperature calibration function to provide a calibrated temperature read.

21. The computer platform of claim 16, wherein the thermometer comprises:
a memory for storing the constant values of the slope and the offset.

22. The computer platform of claim 16, wherein the digital temperature sensor comprises:
a compensation unit to compensate temperature reading of the digital thermometer by using stored constant values of the slope and the offset.

* * * * *